United States Patent Office 3,763,170
Patented Oct. 2, 1973

3,763,170
1 OR 4 SULPHOARYL-6-HYDROXY-2-PYRIDONES
Peter William Austin and Allen Crabtree, Manchester, England, assignors to Imperial Chemical Industries Limited, London, England
No Drawing. Filed Sept. 20, 1971, Ser. No. 182,145
Int. Cl. C07d 31/48
U.S. Cl. 260—294.8 F                 5 Claims

ABSTRACT OF THE DISCLOSURE

By heating certain 3-cyano-6-hydroxy-pyridones containing a benzene or benzyl nucleus in the 1 and/or 4-position the cyano group is converted to aminocarbonyl or replaced by H and a sulphonic acid group is introduced into the benzene or benzyl substituent. The products are useful coupling components for manufacture of water-soluble dyes.

---

This invention relates to new heterocyclic compounds of the 6-hydroxypyrid-2-one series, valuable for use as coupling components for the manufacture of azo dyestuffs.

It is known, in general terms, that a wide variety of compounds of the 6-hydroxy-2-pyridone series can be obtained by condensing together a β-ketocarboxylic ester, a substituted acetic ester and ammonia or an amine. The reaction can be expressed in the general form:

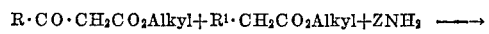

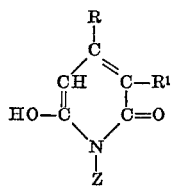

(1)

(see, for example "Heterocyclic compounds—Pyridine and its derivatives—Part 3" which was edited by Linsberg and published by Interscience Publishers in 1962).

However, for compounds in which the symbols R and/or Y represent a sulphonated aryl radical the above process appears to be inoperative and 6-hydroxy-pyrid-2-one compounds containing sulphonic acid groups have not previously been described in the literature. This in turn has placed limitations on the range of azo dyestuffs available by coupling with 6-hydroxy-pyrid-2-one compounds. It has now been found that 3-cyano-6-hydroxypyrid-2-one compounds containing certain substituents in the 1- and 4-positions of the ring when heated with sulphuric acid to hydrolyse the cyano group have sulphonic acid groups introduced into the said substituents.

Thus, according to the invention, there are provided heterocyclic compounds of the formula:

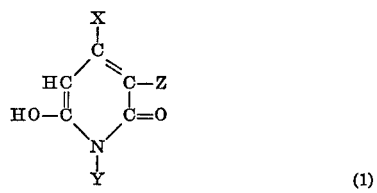

(1)

in which Z represents H or $CONH_2$. X represents an alkyl group of 1 to 4 carbon atoms, or a group of the formula:

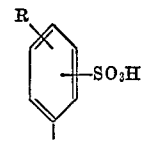

(2)

in which R is an alkyl or alkoxy group of 1 to 4 carbon atoms, and Y represents an alkyl group of 1 to 4 carbon atoms, a group of Formula 2 in which R represents an alkoxy group of 1 to 4 carbon atoms, a group of the formula:

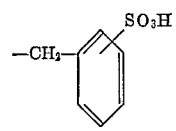

(3)

or a group of the formula:

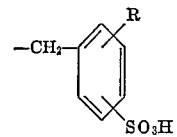

(4)

in which R is an alkyl or alkoxy group of 1 to 4 carbon atoms, at least one of X and Y having a sulphonated benzene nucleus present. The invention also provides a process for manufacture of the new heterocyclic compounds which comprises heating a compound of the formula:

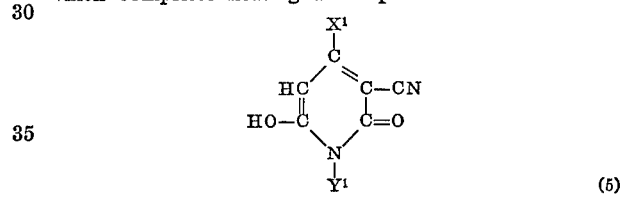

(5)

wherein $X^1$ represents an alkyl group of 1 to 4 carbon atoms, or an alkyl- or alkoxy-phenyl radical in which the alkyl or alkoxy group contains 1 to 4 carbon atoms, and $Y^1$ represents an alkyl group of 1 to 4 carbon atoms, the benzyl group or an alkoxyphenyl, alkylbenzyl or alkoxy benzyl group in which the alkyl or alkoxy group contains 1 to 4 carbon atoms, provided that at least one of $X^1$ and $Y^1$ contains a benzene nucleus, in a sulphuric acid medium whereby sulphonation of a benzene nucleus in X and Y takes place and the CN group is converted to H or $CONH_2$.

The above process may conveniently be carried out by adding the compound of Formula 5 to the sulphuric acid and heating with stirring to the desired temperature until reaction has been effected.

For manufacture of the aminocarbonyl compounds it is preferred in general to use 94 to 97% sulphuric acid and to heat the mixture at 50–60° C. However, in some cases a higher strength e.g. up to 4% oleum, is preferable. For manufacture of the 3-unsubstituted compounds it is preferred to use 70 to 95% sulphuric acid and to heat the mixture at 100–130° C.

The new compounds couple readily with the diazonium salts from a wide range of amines and in consequence are valuable dyestuffs intermediates, for example:

(a) By using a diazonium compound preferably containing one or more sulphonic acid groups, and possibly an azo group a water-soluble dye is obtained which may be used for dyeing and printing a wide variety of material e.g. silk, wool, superpolyamides, polyhydroxylic materials of fibrous structure, e.g. regenerated cellulose, e.g. viscose rayons and natural cellulose, e.g. cotton and linen. Many of the dyestuffs are suitable for dyeing nitrogen-containing materials, especially wool, from an acid bath. In this connection, one can refer, e.g. to diazotised aniline- and naphthylamine mono- or di-sulphonic acids and aminoazobenzene sulphonic acid.

(b) By using a diazonium compound containing a cellulose-reactive group and preferably one or more sulphonic acid groups a water-soluble dye is obtained which can be used for the dyeing and printing of cellulose, polyamide and wool textile materials with which they react in the presence of alkali and, if necessary, the action of heat. Into this category come primarily the diazotisation products of the monocondensation products of aromatic sulphonated diamines e.g. m- and p-phenylenediamine mono- and di-sulphonic acids with polyhalogenated heterocyclic compounds e.g. tri- and tetra-chloropyrimidines or cyanuric chloride and its mono-condensation products with methanol, ammonia or sulphonated monoamines of the benzene or naphthalene series, or aminophenyl-β-sulphatoethylsulphones. Dyestuffs of related properties can be obtained by first forming an azo dyestuff as described under (a) which contains a nitro or acylamino group in the diazo component, reducing or hydrolysing to convert the nitro or acylamino group to $NH_2$ and condensing with the aforesaid poly-halogenated compounds.

(c) By using a diazonium compound of an aromatic amine containing a hydroxyl or carboxyl group ortho to the amino group, dyestuffs are obtained which can be converted by the usual metallisation procedures into chromium or cobalt complexes which are soluble in water and weakly acid dyebaths and can be used for the dyeing and printing of animal fibres, e.g. silk, leather and especially wool, and some synthetic materials e.g. superpolyamides and superpolyurethanes, and polypropylene. For this purpose they may be applied from slightly acid, neutral or slightly alkaline baths, especially an acetic acid bath. Chromium, cobalt, or copper complexes from diazo components containing sulphonic acid groups and nitro or acylamino groups obtained in a similar manner can be used for dyeing wool as described under (a) or reduced or hydrolysed and converted to a cellulose-reactive dye as described under (b). Suitable aromatic amines for this purpose include o-aminophenols, o-aminonaphthols and anthranilic acid and their derivatives containing $SO_3H$ and, optionally Cl and/or $NO_2$ substituents.

The invention may be illustrated by the following examples in which parts and percentages are by weight:

EXAMPLE 1

3 - cyano-1-ethyl-4-(4'-methoxyphenyl)-6-hydroxypyrid-2-one (30.0 parts) was added portionwise during 15 minutes to 90 parts of sulphuric acid (96%) and the solution stirred at 55–60° C. for 17 hours. The solution was allowed to stand for 48 hours, drowned into 200 parts of iso-propanol and the solution diluted to 2000 parts with ether. The liquors were then decanted and the residual solid boiled with 150 parts of iso-propanol. The mixture was cooled and the solid filtered and washed with 20 parts of iso-propanol. The solid was finally boiled with 200 parts of ethyl alcohol, filtered off, washed with ethyl alcohol and dried at 40° C. under vacuum.

On analysis, the product, which is 1-ethyl-3-aminocarbonyl-4-(4'-methoxy - 3' - sulphophenyl)-6-hydroxypyrid-2-one, was found to contain C, 48.6; H, 4.7; N, 8.0; S, 8.1%. $C_{15}H_{16}O_7N_2S$ requires C, 48.9; H, 4.3; N, 7.6; S, 8.7%.

The following sulphonated aminocarbonyl pyridones are prepared in a similar way to Example 1.

| Example | Starting pyridone | Product | Formula | Required C | H | N | S | Found C | H | N | S |
|---|---|---|---|---|---|---|---|---|---|---|---|
| 2 | 1-(4'-methoxyphenyl)-3-cyano-4-methyl-6-hydroxypyrid-2-one. | 1-(4'-methoxy-3'-sulphophenyl)-3-aminocarbonyl-4-methyl-6-hydroxypyrid-2-one. | $C_{14}H_{14}O_7N_2S$ | 47.5 | 4.0 | 7.9 | 9.0 | 46.8 | 3.9 | 7.8 | 8.8 |
| 3 | 1-(2'-methoxyphenyl)-3-cyano-4-methyl-6-hydroxypyrid-2-one. | 1-(2'-methoxy-5'-sulphophenyl)-3-aminocarbonyl-4-methyl-6-hydroxypyrid-2-one. | $C_{14}H_{14}O_7N_2S$ | 47.5 | 4.0 | 7.9 | 9.0 | 46.6 | 3.6 | 7.3 | 9.2 |
| 4 | 1-benzyl-3-cyano-4-methyl-6-hydroxypyrid-2-one. | 1-(4'-sulphobenzyl)-3-aminocarbonyl-4-methyl-6-hydroxypyrid-2-one. | $C_{14}H_{14}O_6N_2S$ | 50 | 4.2 | 8.3 | 9.5 | 49.7 | 4.2 | 8.5 | 9.4 |

EXAMPLE 5

8 parts of 3 - cyano - 6 - hydroxy - 4 - methyl - 1-(4'-methylbenzyl)-pyrid-2-one are added to 76 parts of 4% oleum and the mixture is stirred at 50–55° C. for 16 hours, cooled and drowned into 400 parts of iso-propanol. 800 parts of ether are added and the precipitate, which is the sulphate of 3-aminocarbonyl-6-hydroxy-4-methyl-1-(4'-methyl-2' or 3'-sulphobenzyl)-pyrid-2-one, is filtered off and dried.

Found: C, 36.9; H, 4.1; N, 5.6; S, 14.0%. $C_{15}H_{16}O_6N_2S \cdot H_2SO_4 \cdot 2H_2O$ requires C, 37.0; H, 4.5; N, 5.6; S, 13.3%.

EXAMPLE 6

A solution of 12 parts of 1-benzyl-3-cyano-6-hydroxy-4-methylpyrid-2-one in 94 parts of 4% oleum is stirred at 50–55° C. for 16 hours. 28 parts of ice are added and the mixture is then heated at 130° C. for 3 hours, cooled, and poured into a mixture of 300 parts of ice and 300 parts of water. After stirring at 0–5° C. for 3 hours the precipitate of 6-hydroxy-4-methyl-1-(4'-sulphobenzyl)-pyrid-2-one is collected by filtration and dried.

Analysis: N, 4.5; S, 10.4%. $C_{13}H_{13}O_5NS$ requires N, 4.75; S, 10.8%.

EXAMPLE 7

5 parts of 3-cyano-6-hydroxy-1-(4'-methoxybenzyl)-4-methylpyrid-2-one are stirred for 16 hours at 50–55° C. in 47 parts of 4% oleum, then the mixture is cooled, drowned into 300 parts of n-propanol and 700 parts of ether are added. The precipitate is filtered off and dissolved in a mixture of methanol (100 parts), ether (100 parts) and methylated spirits (100 parts). The solution is charcoal treated, filtered and the filtrate is evaporated to dryness under reduced pressure. The syrupy residue is triturated with acetone (50 parts) whereby it solidifies. The precipitate of the half sulphate of 3-aminocarbonyl-6-hydroxy-1-(4'-methoxy-2' or 3'-sulphobenzyl)-4-methyl-pyrid-2-one is filtered and dried.

Found: C, 40.4; H, 4.2; S, 10.3%. $C_{15}H_{16}O_7N_2S \cdot \frac{1}{2}H_2SO_4 \cdot 2H_2O$ requires C, 39.8; H, 4.6; S, 10.6%.

We claim:
1. A heterocyclic compound of the formula:

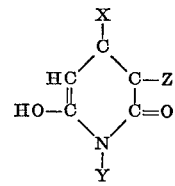

(1)

in which Z represents H or $CONH_2$. X represents an alkyl group of 1 to 4 carbon atoms, or a group of the formula:

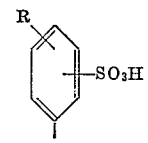

(2)

in which R is an alkyl or alkoxy group of 1 to 4 carbon atoms, and Y represents an alkyl group of 1 to 4 carbon atoms, a group of Formula 2 in which R represents an alkoxy group of 1 to 4 carbon atoms, a group of the formula:

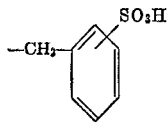

(3)

or a group of the formula:

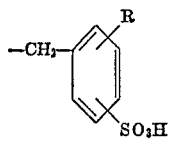

(4)

in which R is an alkyl or alkoxy group of 1 to 4 carbon atoms, at least one of X and Y having a sulphonated benzene nucleus present.

2. A heterocyclic compound as claimed in claim 1 wherein X is methyl.

3. A heterocyclic compound as claimed in claim 1 having the formula:

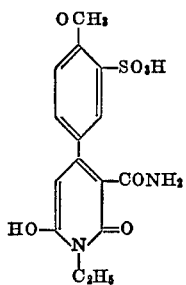

4. A heterocyclic compound as claimed in claim 2 having the formula:

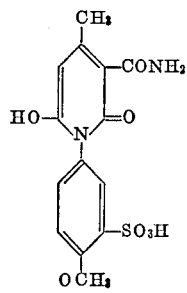

5. A heterocyclic compound as claimed in claim 2 having the formula:

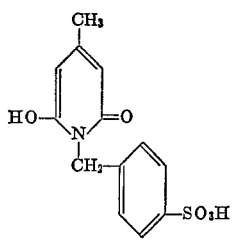

References Cited
UNITED STATES PATENTS 3,668,211   6/1972   Crabtree _____ 260—294.9

FOREIGN PATENTS 2,045,851   9/1970   Germany.

HENRY R. JILES, Primary Examiner

M. A. M. CROWDER, Assistant Examiner

U.S. Cl. X.R.

424—263; 240—156

UNITED STATES PATENT OFFICE
CERTIFICATE OF CORRECTION

Patent No. 3,763,170          Dated October 2, 1973

Inventor(s) Peter William Austin and Allen Crabtree

It is certified that error appears in the above-identified patent and that said Letters Patent are hereby corrected as shown below:

In the Heading, please add --

Claims priority, application Great Britain, October 12, 1970, 48,302/70 --

Signed and sealed this 1st day of October 1974.

(SEAL)
Attest:

McCOY M. GIBSON JR.
Attesting Officer

C. MARSHALL DANN
Commissioner of Patents